Sept. 25, 1951  G. A. HIGHBERG  2,569,056
CHUCK
Filed Dec. 31, 1947
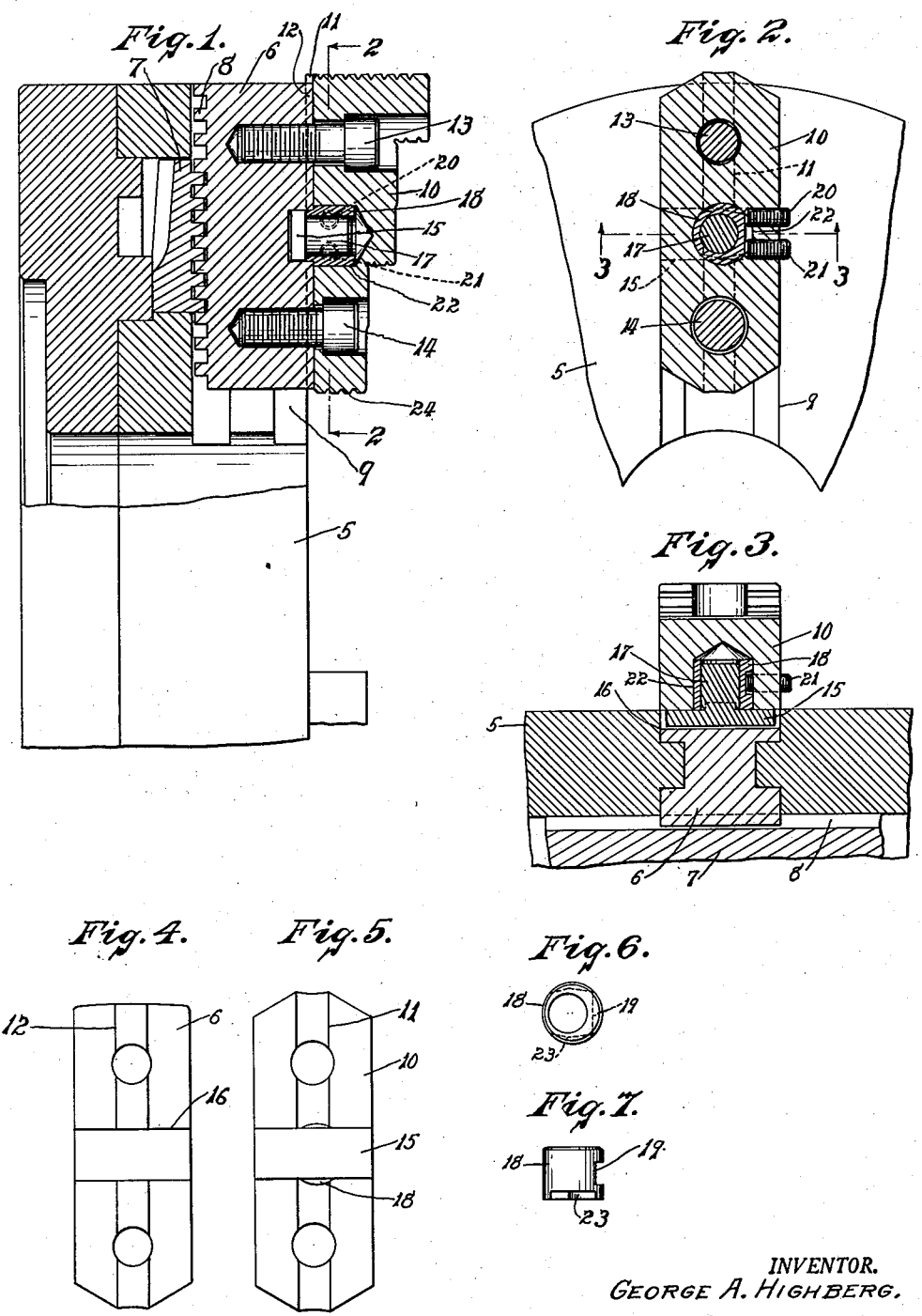
INVENTOR.
GEORGE A. HIGHBERG.
BY Louis V. Lucia
ATTORNEY.

Patented Sept. 25, 1951

2,569,056

UNITED STATES PATENT OFFICE 2,569,056

CHUCK

George A. Highberg, West Hartford, Conn., assignor to The Whiton Machine Company, New London, Conn.

Application December 31, 1947, Serial No. 794,969

9 Claims. (Cl. 279—123)

This invention relates to chucks and more particularly to chucks of the type commonly used on lathes or the like and which have a plurality of upper jaws mounted on master jaws that are radially movable on the face of the chuck by means of a common operating member, such as a scroll ring, which is well known to those skilled in the art.

The primary object of this invention is to provide means whereby each of the upper jaws of such chucks may be adjusted upon their respective master jaws so that they may be positioned with a high degree of accuracy relatively to the center of the chuck.

A further object of this invention is to provide adjusting means for the jaws of chucks whereby the said jaws may be individually adjusted relatively to the axis of the chuck so that all of the jaws will be equally spaced from the said axis with a high degree of accuracy.

A still further object of the invention is to provide such means in a novel construction which is highly efficient, extremely durable, and easy to operate.

Further objects and advantages of this invention will be more clearly understood from the following description and from the accompanying drawings, in which—

Fig. 1 is a side view in central vertical section of a portion of a chuck embodying my invention and partly in central vertical section.

Fig. 2 is a sectional front view of a portion of said chuck on line 2—2 of Fig. 1.

Fig. 3 is sectional side view on line 3—3 of Fig. 2.

Fig. 4 is a plan view of the master jaw shown in Fig. 1.

Fig. 5 is a bottom view of the top jaw shown in Fig. 1, with the anchoring bar thereon.

Fig. 6 is a plan view of the eccentric adjusting bushing included in my invention.

Fig. 7 is a side view of said bushing.

In the embodiment illustrated in the drawing, the numeral 5 denotes the body of a chuck of conventional form having the usual master jaws 6 therein which are radially movable in the body of the chuck by means of a scroll ring 7 that has scroll teeth therein engaging with the teeth 8 on the master jaw. The said master jaws are usually three in number and slide in slots 9 in the body of the chuck.

In the conventional form of the chucks, a top jaw 10 is slidably carried on the master jaws and has a slot 11 in the bottom thereof which engages with a rib 12 on the master jaw to permit relative longitudinal movement between the master and top jaws and keep the said jaws in alignment. Suitable set screws 13—14 are provided for clamping the upper jaw to the master jaw.

This invention provides means for precision adjustment of said upper jaw relatively to the master jaw in order that all of the jaws of a chuck may be positioned at equal distances from the axis thereof. As illustrated in the drawings, the said adjusting means comprises for each set of master and upper jaws, an anchoring bar 15 which is slidably mounted in the transverse slot 16 in the master jaw and has a post 17 projecting perpendicularly therefrom. An eccentric bushing 18 is rotatable on said post and has a slot at one side thereof to provide an abutment face 19 for the ends of the adjustment screws 20—21, which are threaded into the side of the upper jaw at opposite sides of the axis of said bushing and extend into a recess 22 in the bottom of the upper jaw within which the bushing 18 rotatably fits. The said bushing is also cut away at the opposite sides thereof, as at 23, to accommodate the rib 12 which projects from the master jaw and to permit rotation of said bushing.

In the operation of the mechanism illustrated as an embodiment of my invention for adjusting the upper jaws of a chuck, the chuck is first mounted on the spindle of a turning machine, such as a lathe, and a suitable micrometer indicator is secured in a convenient position, such as in the tool holder of the lathe, to indicate the positions of the work engaging faces 24 of the upper jaws relatively to the axis of the said spindle. The chuck is then rotated against the micrometer indicator and the upper jaws of said chuck are adjusted longitudinally on the master jaw to the proper reading of the indicator. This adjustment is performed by loosening one of the screws 20 or 21 and tightening the other so as to rotate the bushing 18 in the proper direction for the desired adjustment. The rotation of this bushing on the post 17 will slide the upper jaw longitudinally on the lower jaw up to the proper reading of the micrometer indicator and thereby provide a micrometrical adjustment for accurately locating each of said upper jaws on the true operating center of the chuck. The side motion applied by the eccentricity of the bushing 18 will be taken up by sliding action of the bar 15 within the groove 16.

When the upper jaw has been thus adjusted, the clamping screws 13—14 are tightened and the operation is completed. This adjustment of the upper jaws on a chuck will permit all of said jaws to accurately engage and hold work placed in said chuck on the true center of the machine spindle.

From the above description it will be clearly understood that my invention provides a construction which is highly practical and desirable in chucks of the character described and which is readily adaptable for chucks of conventional types.

I claim:

1. In a chuck of the character described and having a master jaw and an upper jaw slidably mounted thereon, means for adjustably positioning said upper jaw relatively to the master jaw, said means including a post slidably anchored in the master jaw, an eccentric bushing rotatable on said post and rotatably fitting within a recess in the upper jaw, adjusting screws threaded to said upper jaw and engaging said eccentric bushing on opposite sides of the longitudinal axis of said post for rotating the same on said post to thereby move the upper jaw relatively to the lower jaw, and means for clamping the said jaws together in relatively adjusted position.

2. A chuck of the character described comprising a master jaw and an upper jaw adjustably carried thereon, adjusting means including a bar slidably mounted in a slot extending transversely in the face of said master jaw, a post extending perpendicularly to said bar, an eccentric bushing rotatable on said post and closely fitting within a recess in the bottom of said upper jaw, adjusting screws threaded into the side of said upper jaw and abutting said bushing at opposite sides of the axis of said post to permit rotation of said bushing by operation of said screws, and means for clamping said jaws in relatively adjusted position.

3. In a chuck of the character described comprising a master jaw and an upper jaw slidably carried thereon, adjusting means for adjusting the position of said upper jaw relatively to the lower jaw, the said adjusting means including a bar mounted in a slot extending transversely in the face of said master jaw, a post projecting perpendicularly from said bar, an eccentric bushing rotatable on said post and fitting within a recess in the bottom of the upper jaw, the said bushing having a flat surface at one side thereof, a pair of set screws threaded in the side of said upper jaw and engaging portions of said flat surface at opposite sides of the axis of said post to thereby permit rotation of said bushing by loosening one screw and tightening the other for adjustably sliding said upper jaw relatively to the master jaw and retaining said bushing in adjusted position, and means for clamping said upper jaw to the master jaw in adjusted position.

4. In a chuck of the character described comprising a plurality of master jaws each movable radially in said chuck by a common member, an upper jaw on each of said master jaws and each of said master jaws having a rib on the face thereof fitting within a slot in the bottom of the upper jaw to permit longitudinal movement of the upper jaw, means for adjusting each of said upper jaws relatively to their respective master jaws and to the axis of said chuck; said adjusting means including an anchoring bar slidable in a slot extending transversely in the face of the master jaw and located below the said face, a post extending perpendicularly from said bar, an eccentric bushing rotatable on said post and fitting within a recess in the bottom of the upper jaw, the said bushing having portions thereof cut away to accommodate portions of the rib adjacent the transverse slot and a slot at one side thereof to provide abutments, a pair of adjusting screws located at opposite sides of the axis of said post and threaded into said upper jaw, the said screws projecting into said recess and abutting the bottom of said slot at opposite sides of said axis to permit rotation of said eccentric bushing by loosening one and tightening the other of said screws and thereby adjustably moving the upper jaw longitudinally upon the master jaw and relatively to the axis of the chuck, and means for clamping the jaws together in adjusted position.

5. A chuck comprising a body, a master jaw member radially movable on said body, a top jaw member longitudinally slidable on said master jaw member, and means for adjusting said top jaw member on the master jaw member; said means including a member transversely slidable in one of said jaw members, an eccentric member carried by said slidable member and extending into the other of said jaw members, and adjusting screws for adjusting said eccentric member.

6. A chuck comprising a body, a master jaw member slidable in said body, a top jaw member slidably mounted on said master jaw member, a projection slidably mounted on one of said jaw members, an eccentric member rotatable on said projection and extending into the other of said jaw members, means in the said other jaw member in contact with said eccentric member for adjustably rotating said member, and means for clamping said jaws in relatively adjustable position.

7. A chuck comprising a body, a master jaw member radially movable in said body, a top jaw member slidably mounted in said master jaw member, an eccentric member rotatably mounted on one of said jaw members and abutting the other of said members for moving the top jaw member relatively to the master jaw member, and screw means for rotating said eccentric member to adjustably position the said top jaw member relatively to the master jaw member.

8. A chuck comprising a body, a master jaw member slidable in said body, a top jaw member longitudinally slidable on said master jaw member, a projection on one of said jaw members, an eccentric member rotatably mounted on said projection and abutting the other of said jaw members, and screw means in said other jaw member abutting said eccentric member on opposite sides of the axis thereof for rotating said member to cause movement of said top jaw relatively to the master jaw.

9. A chuck comprising a body, a master jaw member radially movable in said body, a top jaw member slidable on said master member jaw, a post slidably secured to said master jaw member, an eccentric member rotatable on said post and extending into said top jaw member, and a pair of adjusting screws threaded into said top jaw and abutting said eccentric at opposite sides of the axis thereof for rotating it to cause adjustment of the top jaw member relatively to the master jaw member.

GEORGE A. HIGHBERG.

REFERENCES CITED

The following references are of record in the file of this patent:

UNITED STATES PATENTS

| Number | Name | Date |
|---|---|---|
| 945,261 | Blum | Jan. 4, 1910 |

FOREIGN PATENTS

| Number | Country | Date |
|---|---|---|
| 182,492 | Great Britain | Sept. 21, 1922 |